United States Patent
Fabijancic et al.

(10) Patent No.: US 10,311,029 B2
(45) Date of Patent: Jun. 4, 2019

(54) SHARED DATABASE DICTIONARIES

(71) Applicant: SAP SE, Walldorf (DE)

(72) Inventors: Toni Fabijancic, Eppelheim (DE); Sebastian Mietke, Wiesloch (DE)

(73) Assignee: SAP SE, Walldorf (DE)

( * ) Notice: Subject to any disclaimer, the term of this patent is extended or adjusted under 35 U.S.C. 154(b) by 207 days.

(21) Appl. No.: 15/397,961

(22) Filed: Jan. 4, 2017

(65) Prior Publication Data

US 2018/0189331 A1   Jul. 5, 2018

(51) Int. Cl.
 *G06F 16/21*   (2019.01)
 *G06F 16/22*   (2019.01)
(52) U.S. Cl.
 CPC ........ *G06F 16/212* (2019.01); *G06F 16/2282* (2019.01)
(58) Field of Classification Search
 CPC ......... G06F 17/30294; G06F 17/30339; G06F 16/212; G06F 16/2282
 See application file for complete search history.

(56) References Cited

U.S. PATENT DOCUMENTS

| | | | | |
|---|---|---|---|---|
| 2001/0044795 A1* | 11/2001 | Cohen | ............... | G06F 17/30699 |
| 2003/0037034 A1* | 2/2003 | Daniels | ............... | G06Q 10/087 |
| 2005/0055357 A1* | 3/2005 | Campbell | ............... | G06F 8/61 |
| 2015/0039585 A1* | 2/2015 | Fabijancic | ........ | G06F 17/30442 |
| | | | | 707/713 |
| 2016/0050296 A1* | 2/2016 | Crowther | ............ | H03M 7/3084 |
| | | | | 709/247 |
| 2016/0366534 A1* | 12/2016 | Griesmann | ........... | H04W 4/005 |

* cited by examiner

*Primary Examiner* — Jay A Morrison
(74) *Attorney, Agent, or Firm* — Buckley, Maschoff & Talwalkar LLC

(57) ABSTRACT

A system includes determination of a match between a first table column of a plurality of table columns of database tables and a second table column of the plurality of table columns, determination, based on stored metadata, of a first data dictionary associated with the first table column and a second data dictionary associated with the second table column, merging of the first data dictionary and the second data dictionary to generate a merged data dictionary, and modification of the stored metadata to associate the first data dictionary with the merged data dictionary and to associate the second data dictionary with the merged data dictionary.

18 Claims, 9 Drawing Sheets

SHARED DATABASE DICTIONARIES

BACKGROUND

Database tables include several database records, and several values for each database record. Storage of these values typically consumes large amounts of memory (e.g., disk-based memory or Random Access memory).

Conventionally, the amount of memory required to store table values may be reduced by storing small value IDs instead of the values themselves. In order to facilitate such storage, a dictionary is used which maps table values into value IDs. Each unique value in the dictionary is associated with one unique value ID. Therefore, when a particular value is to be stored in a database record, the value ID for the value is determined from the dictionary and the value ID is stored in the record instead of the value itself.

Despite the foregoing, systems are desired to further reduce the amount of memory consumed by a database system.

DETAILED DESCRIPTION

The following description is provided to enable any person in the art to make and use the described embodiments. Various modifications, however, will remain readily apparent to those in the art.

Generally, some embodiments provide the sharing of dictionaries between database table columns. This sharing may reduce an amount of memory required to store system dictionaries. According to some embodiments, a system identifies columns which store similar data values, determines, based on desired operating parameters, to provide a shared dictionary for these columns, and merges the dictionaries of these columns to generate a shared dictionary.

Figure 1:
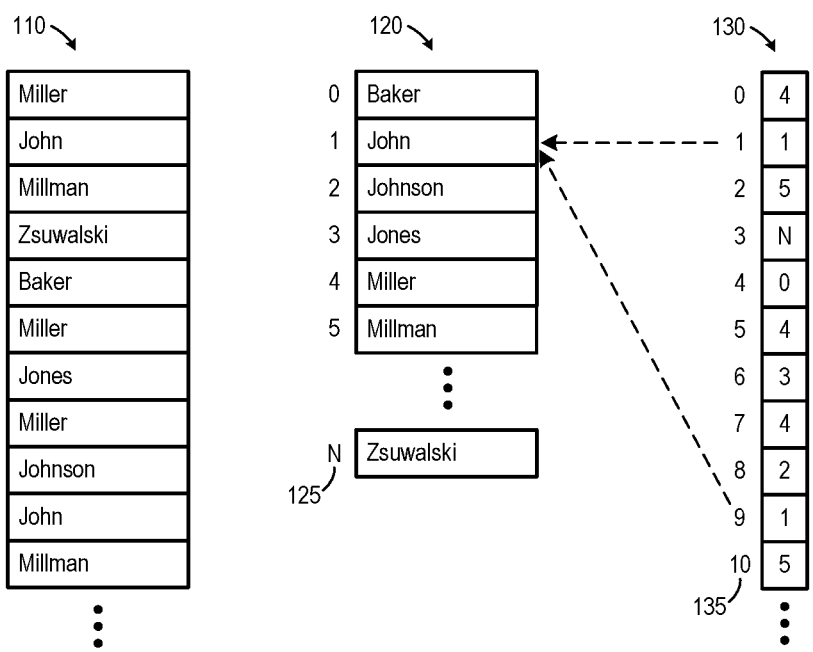
FIG. 1 illustrates a database column, a database dictionary and an encoded database column according to some embodiments.

FIG. 1 illustrates stored column values 110, dictionary 120 and dictionary-encoded column values 130 according to some embodiments. Column values 110 may comprise the values of a column of any database table. Column values 110 are stored in column-store format (i.e., the values of a column across several data records are stored contiguously in memory) but embodiments are not limited thereto.

In the present example, dictionary 120 is the dictionary of a database table column which is associated with column values 110. Dictionary 120 is therefore used to encode column values 110. More specifically, each element at position i of dictionary 120 stores the value associated with value ID i. That is, the value "Baker" is associated with value ID 0, while the value "John" is associated with value ID 1, etc. Encoded values 130 represent column values 110 after encoding based on dictionary 120. Specifically, each occurrence of value "Baker" has been replaced by value ID 0, each occurrence of value "John" has been replaced by value ID 1, etc.

Figures 2A, 2B:
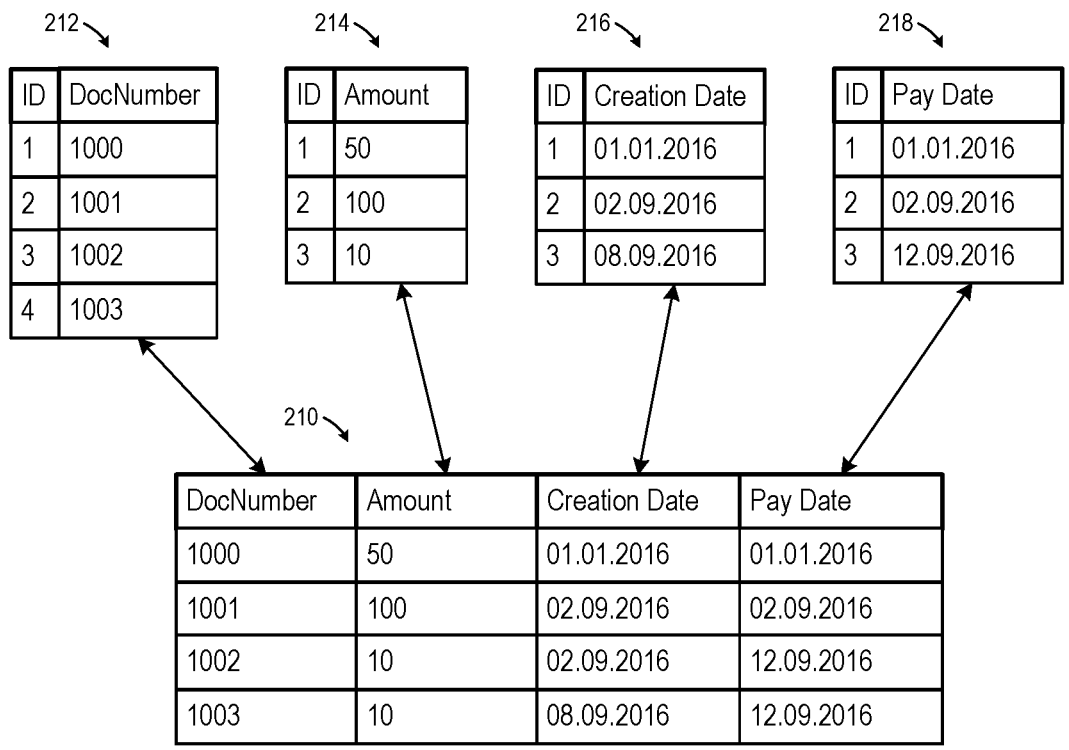
FIG. 2A illustrates a database table and associated database dictionaries according to some embodiments.
FIG. 2B illustrates the database table of FIG. 2A with values encoded using the associated database dictionaries of FIG. 2A according to some embodiments.

FIG. 2A illustrates a tabular representation of a portion of database table 210, along with data dictionaries which are respectively associated with each of the columns of database table 210. In particular, dictionary 212 is associated with the DocNumber column of table 210, dictionary 214 is associated with the Amount column of table 210, dictionary 216 is associated with the Creation Date column of table 210, and dictionary 218 is associated with the Pay Date column of table 210. Each data dictionary maps every unique value of its associated column to a unique (for that dictionary) value ID. FIG. 2B illustrates database table 210 including values encoded as described above with respect to FIG. 1, and in view of dictionaries 212-218.

Figures 3A, 3B:
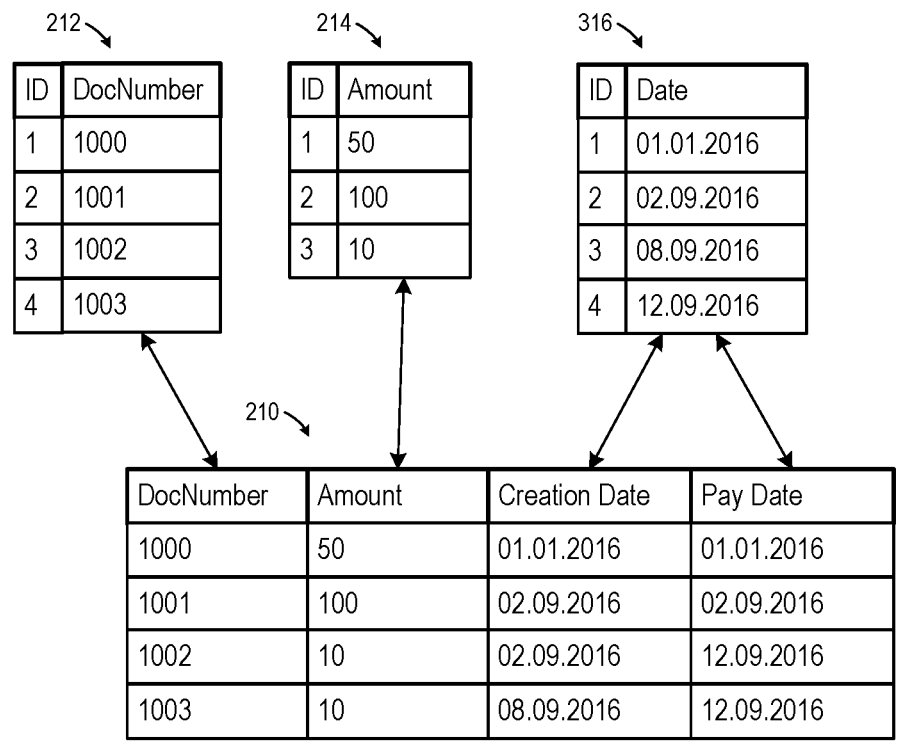
FIG. 3A illustrates a database table and associated database dictionaries according to some embodiments.
FIG. 3B illustrates the database table of FIG. 3A with values encoded using the associated database dictionaries of FIG. 3A according to some embodiments.

FIG. 3A illustrates database table 210 of FIG. 2A, along with data dictionaries which are respectively associated with each of the columns of database table 210. However, unlike FIG. 2A, data dictionary 316 is associated with the Creation Date column and with the Pay Date column of table 210. That is, data dictionary 316 is shared between the Creation Date column and the Pay Date column. As is also evident, the memory required to store data dictionary 316 is less than the memory required to store data dictionaries 216 and 218, which were replaced by data dictionary 316.

FIG. 3B illustrates database table 210 including values encoded as described above with respect to FIG. 1, and in view of dictionaries 212, 214 and 316. The encoding differs slightly from the encoding shown in FIG. 2B due to the use of dictionary 316 instead of dictionaries 216 and 218. Specifically, the encoded values of the last two rows of the Pay Date column are "4" instead of "3". Despite this difference, the same amount of memory is required to store the encoded values of table 210 of FIG. 3B and the encoded values of table 210 of FIG. 2B.

Figure 4A:
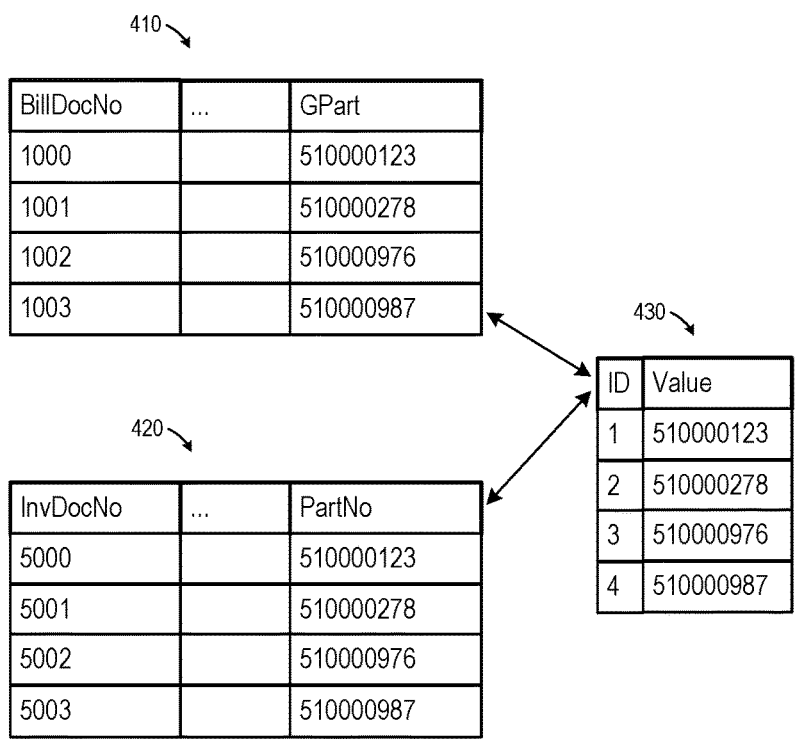
FIG. 4A illustrates two database tables and a shared database dictionary according to some embodiments.
Figure 4B:
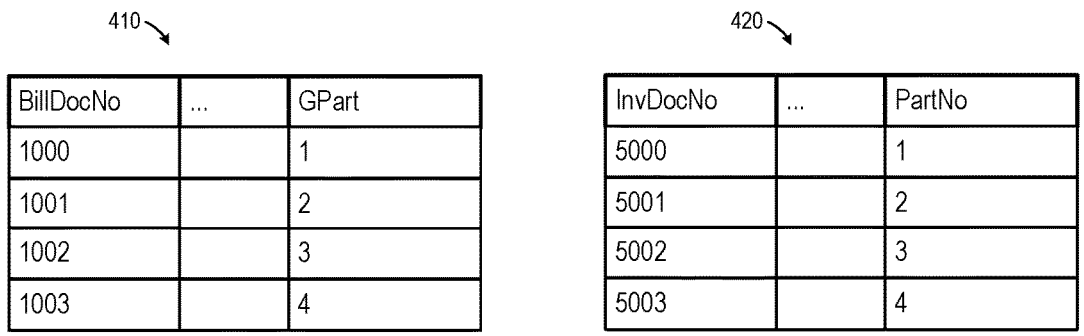
FIG. 4B illustrates the database tables of FIG. 4A with values encoded using the database dictionary of FIG. 4A according to some embodiments.

FIG. 4A illustrates database tables 410, 420 and shared data dictionary 430 according to some embodiments. As shown, data dictionary 430 is shared among a GPart column of table 410 and a PartNo column of table 420. The memory required to store data dictionary 430 is less than the memory which would be required to store a data dictionary for the GPart column of table 410 and a separate (but identical, in view of the column values) data dictionary for the PartNo column of table 420. FIG. 4B illustrates database tables 410 and 420 including values encoded in view of dictionary 430.

Accordingly, embodiments may provide sharing of a data dictionary among two or more columns of a single database table (e.g., as illustrated in FIG. 3A) and/or sharing of a data dictionary among two or more columns of two or more database tables (e.g., as illustrated in FIG. 4A).

Figure 5:
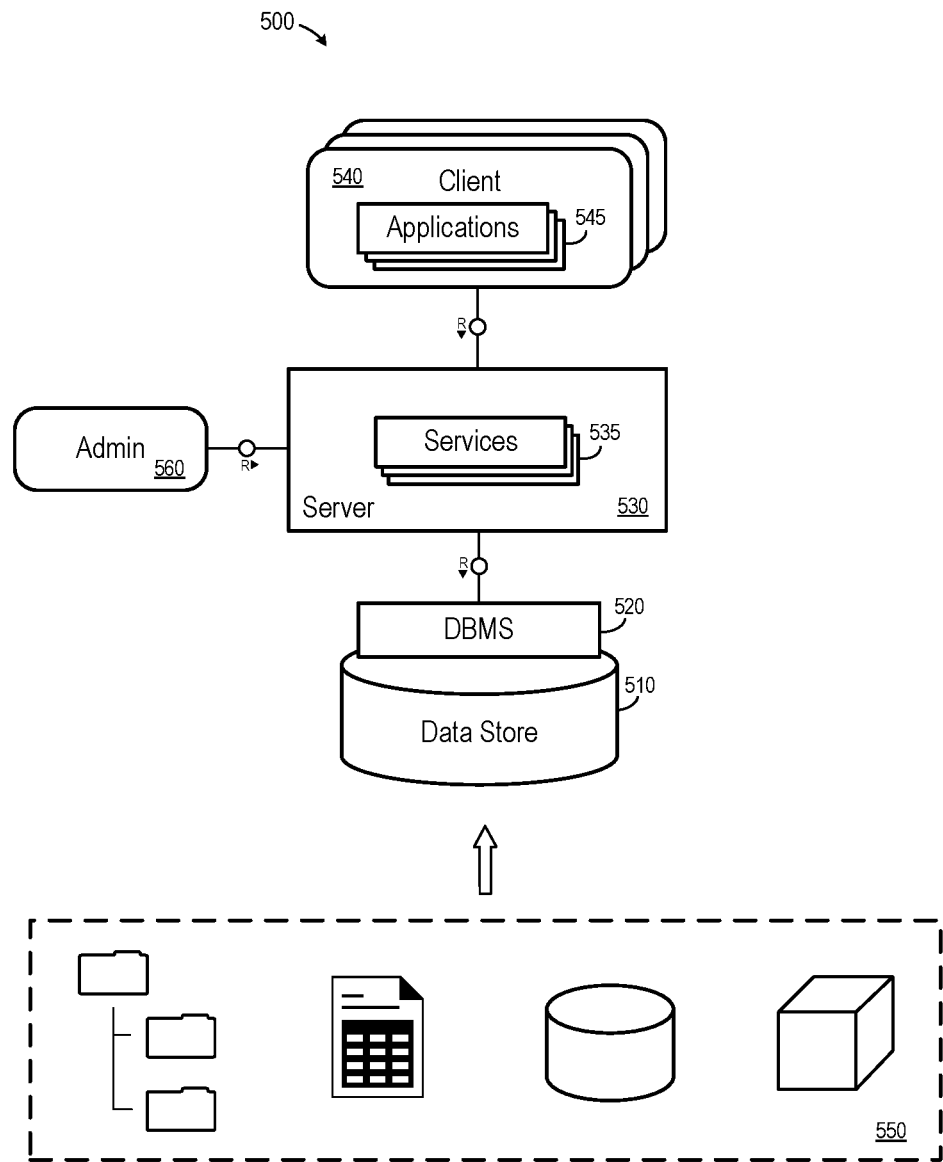
FIG. 5 is a block diagram of a system according to some embodiments.

FIG. 5 is a block diagram of system 500 according to some embodiments. Embodiments are not limited to system 500 or to a database architecture.

System 500 includes data store 510, database management system (DBMS) 520, server 530, services 535, clients 540, applications 545, data sources 550 and administration device 560. Generally, services 535 executing within server 530 receive requests from applications 545 executing on clients 540 and provides results to applications 545 based on data stored within data store 510.

In some embodiments, data store 510 is implemented in Random Access Memory (e.g., cache memory for storing recently-used data) and one or more fixed disks (e.g., persistent memory for storing their respective portions of the full database). Alternatively, data store 510 may implement an "in-memory" database, in which volatile (e.g., non-disk-based) memory (e.g., Random Access Memory) is used both for cache memory and for storing its entire respective portion of the full database. In some embodiments, the data of data store 510 may comprise one or more of conventional tabular data, row-based data stored in row format, column-based data stored in columnar format, and object-based data. Data store 510 may also or alternatively support multi-tenancy by providing multiple logical database systems which are programmatically isolated from one another. Moreover, the data of data store 510 may be indexed and/or selectively replicated in an index to allow fast searching and retrieval thereof.

Data store 510 may store metadata describing the structure, relationships and meaning of the data stored within data store 510. This information may be generated automatically and/or by a database administrator operating administration device 560. According to some embodiments, the metadata includes data defining the schema of database tables stored within data store 510. A schema of a database table may specify the name of the database table, columns of the database table, the data type associated with each column, and other information associated with the database table. The metadata may also define associations between database table columns and data dictionaries.

Data sources 550 may comprise any sources of datasets which are or become known, including but not limited to database views, spreadsheets, relational databases and/or OnLine Analytical Processing cubes. According to some embodiments, new datasets from data sources 550 are occasionally stored within data store 510. Each type of data source 550 may require a particular Extract, Transform and Load process in order to store its data within data store 510.

DBMS 520 serves requests to query, retrieve, create, modify (update), and/or delete data of data store 510, and also performs administrative and management functions. Such functions may include data dictionary management as described herein, snapshot and backup management, indexing, optimization, garbage collection, and/or any other database functions that are or become known. DBMS 520 may also provide application logic, such as database procedures and/or calculations, according to some embodiments. This application logic may comprise scripts, functional libraries and/or compiled program code.

Server 530 generally provides data of data store 510 to reporting clients, such as client 520, in response to instructions (e.g., SQL statements) received therefrom. In some embodiments, server 530 receives an instruction from client 520. Server 530 generates a statement execution plan based on the instruction and on the above-mentioned metadata. The statement execution plan is forwarded to data store 510, which executes the plan and returns a corresponding dataset.

Server 530 then returns the dataset to client 520. Embodiments are not limited thereto.

Server 530 may be separated from or closely integrated with DBMS 520. A closely-integrated server 530 may enable execution of services 535 completely on the database platform, without the need for an additional server. For example, according to some embodiments, server 530 provides a comprehensive set of embedded services which provide end-to-end support for Web-based applications. The services may include a lightweight web server, configurable support for Open Data Protocol, server-side JavaScript execution and access to SQL and SQLScript.

Each of clients 540 may comprise one or more devices executing program code of a software application for presenting user interfaces to allow interaction with server 530. Presentation of a user interface may comprise any degree or type of rendering, depending on the type of user interface code generated by server 530. For example, a client 540 may execute a Web Browser to receive a Web page (e.g., in HTML format) from server 530, and may render and present the Web page according to known protocols. A client 540 may also or alternatively present user interfaces by executing a standalone executable file (e.g., an .exe file) or code (e.g., a JAVA applet) within a virtual machine.

Administration device 560 may also comprise one or more devices executing program code for presenting interfaces to allow interaction with server 530. Such interaction may comprise setting parameters governing operation of server 530 and/or DBMS 520 as will be described below, database administration, backup and maintenance, as well as modification of metadata describing the data of data store 510.

Figure 6:
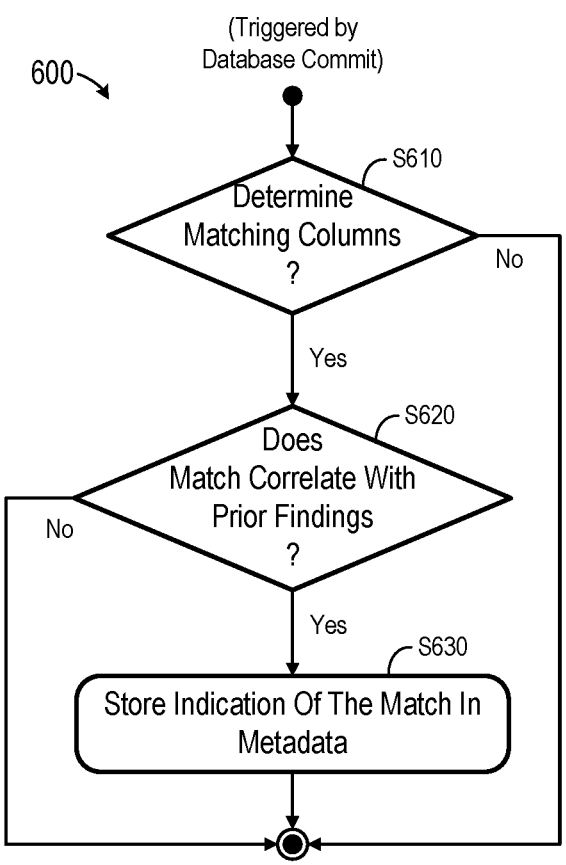
FIG. 6 comprises a flow diagram of a process according to some embodiments.
Figure 7:
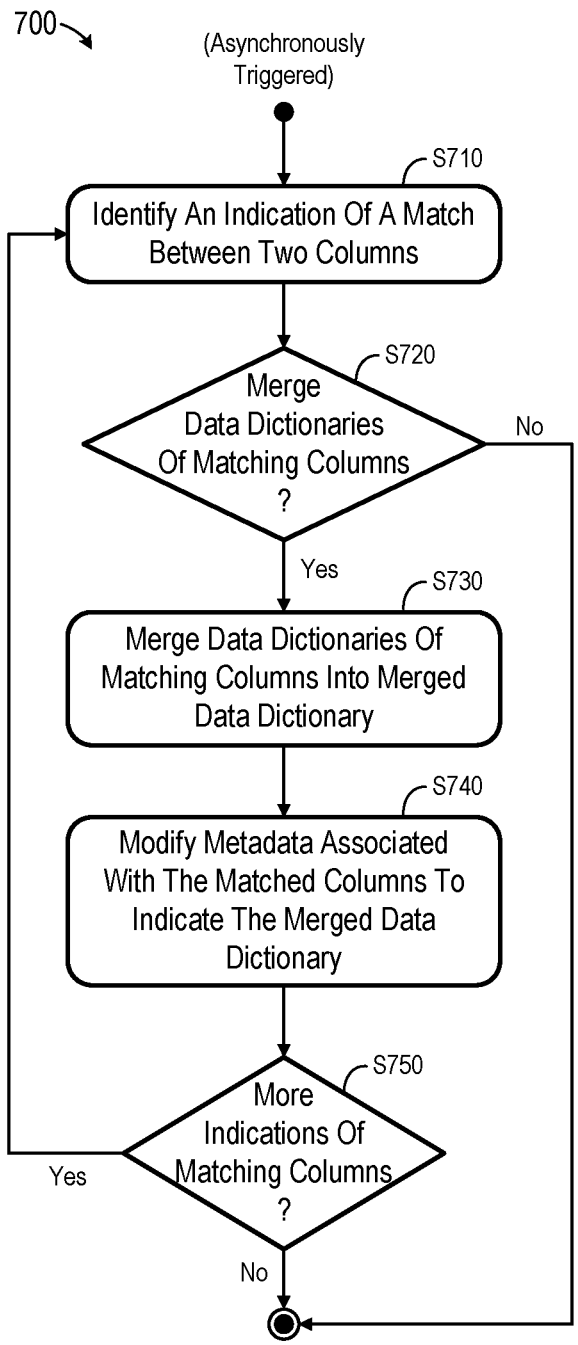
FIG. 7 comprises a flow diagram of a process according to some embodiments.

FIG. 6 comprises a flow diagram of process 600 according to some embodiments. In some embodiments, various hardware elements of server 530 execute program code to perform process 600. Process 600 and all other processes mentioned herein may be embodied in processor-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Process 600 may be executed by a service or daemon according to some embodiments. Process 600 may be executed at any suitable time or in response to any suitable event. In the present example, process 600 is triggered by a database commit. The trigger may be table- or column-specific, in that a commit of data to a table or column may trigger execution of process 600 with respect to that table or column.

In this regard, at S610, metadata and/or values of columns are compared to determine matching columns for the purpose of sharing data dictionaries. For example, if process 600 is triggered by a commit to a database column, the metadata (e.g., name, datatype, etc.) of the column and values of the column may be compared to the metadata and values of all other columns of data store 510. In some embodiments, the columns to be compared against the current column are a specified subset of the columns of data store 510.

The determination at S610 may be based on predetermined rules for determining matching columns. For example, if the values of two different columns overlap by more than a particular percentage of values, or by more than a particular raw number, then those two columns may be determined as matching. The threshold percentage or number may differ depending on whether the column names are the same or similar (e.g., a lower threshold for same or similar column names). One or more sets (i.e., of two or more columns) of matching columns may be determined at S610 according to some embodiments.

Process 600 terminates if no matching columns are determined at S610. If matching columns are determined, then, at S620, it is determined whether the determined match or matches correlate with other matching determinations already specified in the metadata of system 500. For example, the metadata may indicate that two columns which were determined to match at S610 were, on several occasions, previously determined to not match. In another example, the datatypes of the matching columns are compared at S620 and any matches involving different datatypes are rejected. In either case, process 600 also terminates.

If the determined match (or matches) is determined to correlate with prior findings, an indication of the match is stored in the metadata of system 500 (e.g., in a global repository of data store 510). The indication may simply comprise metadata identifying two or more matching columns and the data based on which the match was determined (e.g., overlap statistics, column names, etc.).

Process 700 may be executed by a service or daemon to merge data dictionaries into a single shared dictionary according to some embodiments. Process 700 may operate based on the metadata stored during execution of process 600 as described above.

Process 700 may be triggered asynchronously based on any parameter, including but not limited to time, a number of commits, or an instruction from an administrator. At S710, an indication of a match between two or more columns is identified. As described with respect to process 600, the indication may be stored in metadata, and may associate two or more columns. The indication may also specify information based on which the two or more columns were determined to match, and/or other metadata relating to the matched columns (e.g., cardinality, etc.)

At S720, it is determined whether to merge the data dictionaries of the two or more columns of the match. This determination may be based on customizable rules set by a database administrator according to some embodiments. For example, the determination may be based on a number of times (relative to the number of entries) that the match was determined by execution of process 600. In this regard, this number may be tracked by a counter in the metadata and incremented each time an already-identified match is determined by process 600.

The rules may also take into account the extent of value overlap in the matching columns. As described above, the overlap may be defined as a raw number or a percentage, and may also be specified in the metadata identifying the match.

The determination at S720 may also be based on a setting indicating the relative importances of reducing memory consumption and improving performance. Generally, memory consumption is reduced (i.e., good) and performance decreases (i.e., bad) if dictionaries are merged. For example, if it is more important to reduce memory consumption (as indicated by a database administrator within configurable database settings), then the determination at S720 may be based on lower thresholds (i.e., in the amount of overlap and/or number of times a match was previously determined) than in a case where it is more important to improve performance.

Figure 8:
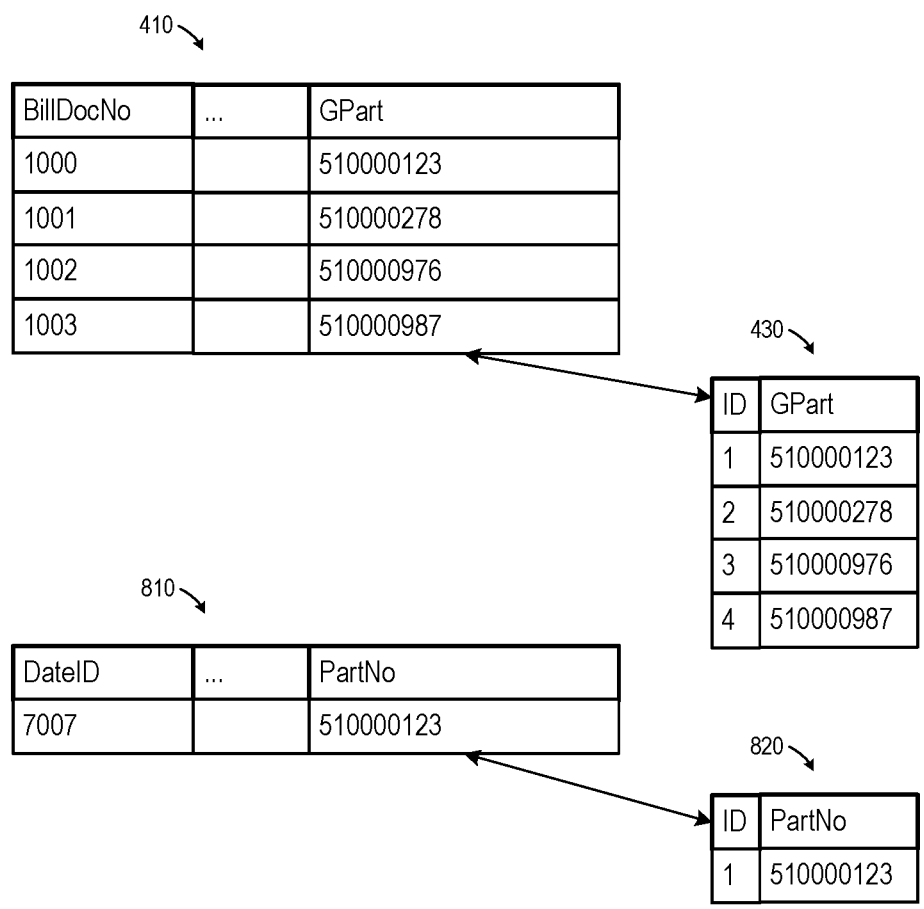
FIG. 8 illustrates two database tables and associated database dictionaries according to some embodiments.

FIG. 8 illustrates an example in which the GPart column of table 410 and the PartNo column of table 810 were determined to match at S610. This determination may have been based on the fact that the sole value of the PartNo column is included in the values of the GPart column. Merging dictionaries 430 and 820 would save the memory required to store one dictionary row. However, performance would suffer because encoding of the PartNo column would require searching four rows of the merged dictionary as opposed to one row of dictionary 820.

Flow proceeds from S720 to S730 if it is determined to merge the data dictionaries of the matching columns. The data dictionaries of the (two or more) matching columns are merged into a merged data dictionary at S730. Data dictionary 316 of FIG. 3A is an example of a merged data dictionary created by merging dictionaries 216 and 218 according to some embodiments.

Next, at S740, the metadata associated with the matched columns in the global repository is modified to indicate that the merged dictionary is the data dictionary for each of the two or more matching columns. Accordingly, the merged dictionary will be used when encoding or decoding the data values of any of the two or matching columns.

At S750, it is determined whether the global repository includes any additional indications of matching columns for evaluation by process 700. If so, flow returns to S710 and proceeds as described above with respect to a new set of two or more matching table columns. If not, flow terminates.

Figure 9:
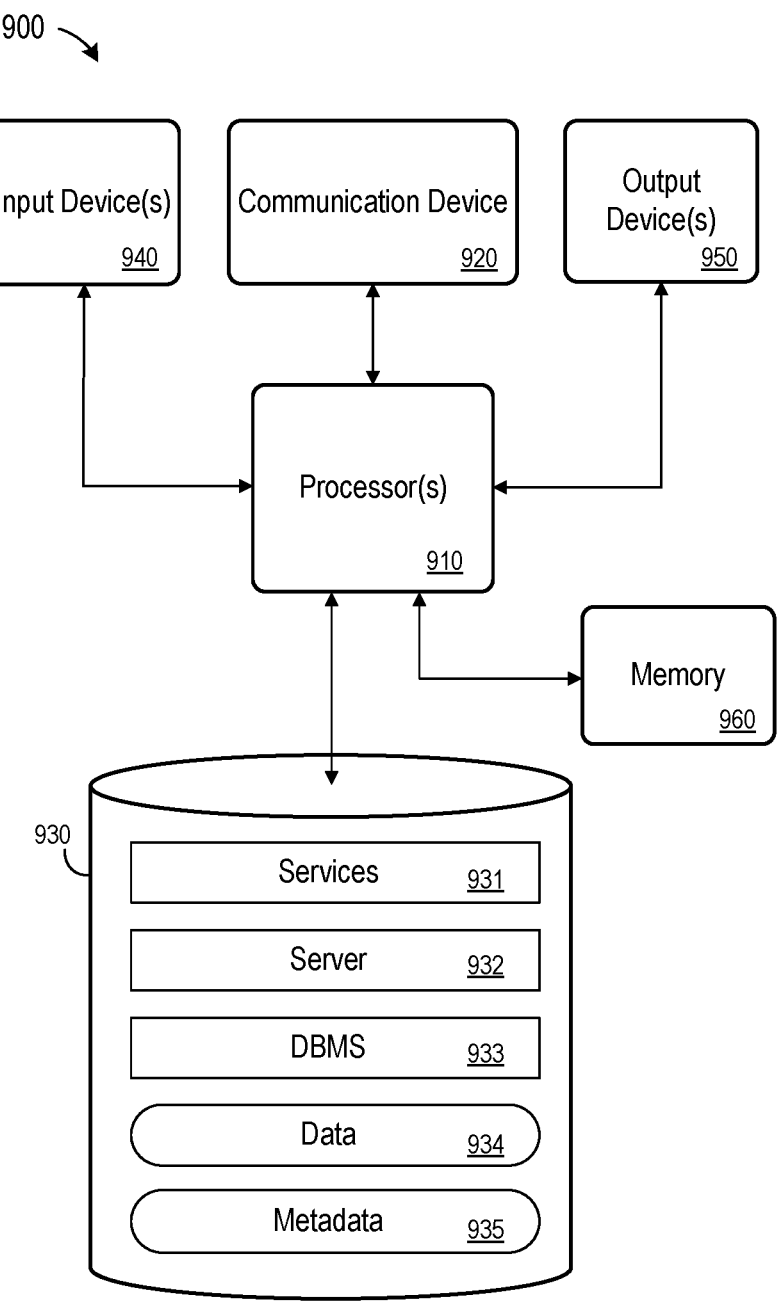
FIG. 9 is a block diagram of an apparatus according to some embodiments.

FIG. 9 is a block diagram of apparatus 900 according to some embodiments. Apparatus 900 may comprise a general-purpose computing apparatus and may execute program code to perform any of the functions described herein. Apparatus 900 may comprise an implementation of server 530, DBMS 520 and data store 510 of FIG. 5 in some embodiments. Apparatus 900 may include other unshown elements according to some embodiments.

Apparatus 900 includes processor(s) 910 operatively coupled to communication device 920, data storage device 930, one or more input devices 940, one or more output devices 950 and memory 960. Communication device 920 may facilitate communication with external devices, such as a reporting client, or a data storage device. Input device(s) 940 may comprise, for example, a keyboard, a keypad, a mouse or other pointing device, a microphone, knob or a switch, an infra-red (IR) port, a docking station, and/or a touch screen. Input device(s) 940 may be used, for example, to enter information into apparatus 900. Output device(s) 950 may comprise, for example, a display (e.g., a display screen) a speaker, and/or a printer.

Data storage device 930 may comprise any appropriate persistent storage device, including combinations of magnetic storage devices (e.g., magnetic tape, hard disk drives and flash memory), optical storage devices, Read Only Memory (ROM) devices, etc., while memory 960 may comprise Random Access Memory (RAM), Storage Class Memory (SCM) or any other fast-access memory.

Services 931, server 932 and DBMS 933 may comprise program code executed by processor 910 to cause apparatus 900 to perform any one or more of the processes described herein. Embodiments are not limited to execution of these processes by a single apparatus.

Data 934 and metadata 935 (either cached or a full database) may be stored in volatile memory such as memory 960. Metadata 935 may include information regarding column names, column statistics, matching columns, data dictionaries associated with one or more columns, and any other metadata associated with the data sources stored within data 934. Data storage device 930 may also store data and other program code for providing additional functionality and/or which are necessary for operation of apparatus 900, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of system 500 may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Embodiments described herein are solely for the purpose of illustration. Those in the art will recognize other embodiments may be practiced with modifications and alterations to that described above.

What is claimed is:

1. A system comprising:
   a data storage device storing:
      one or more database tables, the one or more database tables comprising a plurality of table columns; and
   a database management system to:
      determine a match between a first one of the plurality of table columns and a second one of the plurality of table columns, wherein determination of the match comprises determination that an overlap of values of the first one of the plurality of table columns and values of the second one of the plurality of table columns is greater than a threshold;
      determine, based on stored metadata, a first data dictionary associated with the first one of the plurality of table columns and a second data dictionary associated with the second one of the plurality of table columns;
      merge the first data dictionary and the second data dictionary to generate a merged data dictionary; and
      modify the stored metadata to associate the first data dictionary with the merged data dictionary and to associate the second data dictionary with the merged data dictionary.

2. A system according to claim 1, wherein determination of the match comprises determination of a match between the first one of the plurality of table columns, the second one of the plurality of table columns, and a third one of the plurality of table columns,
   wherein merging of the first data dictionary and the second data dictionary comprises merging of the first data dictionary, the second data dictionary and the third data dictionary to generate the merged data dictionary, and
   wherein modification of the stored metadata comprises modification of the stored metadata to associate the third data dictionary with the merged data dictionary.

3. A system according to claim 2, wherein the first one of the plurality of table columns and the second one of the plurality of table columns belong to a same database table, and wherein the third one of the plurality of table columns belongs to a different database table.

4. A system according to claim 1, the database management system to determine the threshold based on a setting indicating a relative priority between reduced memory consumption and increased performance.

5. A system according to claim 1, wherein the first one of the plurality of table columns and the second one of the plurality of table columns belong to a same database table.

6. A system according to claim 1, wherein the first one of the plurality of table columns and the second one of the plurality of table columns belong to different database tables.

7. A system according to claim 1, the database management system to:
   receive an instruction to commit a first value to the first one of the plurality of table columns;
   determine a first value ID from the merged data dictionary based on the first value;
   store the first value ID in the first one of the plurality of table columns;
   receive an instruction to commit a second value to the second one of the plurality of table columns;
   determine a second value ID from the merged data dictionary based on the second value; and
   store the second value ID in the second one of the plurality of table columns.

8. A computer-implemented method comprising:
   determining a match between a first table column of a plurality of table columns of database tables and a second table column of the plurality of table columns, wherein determining the match comprises determining that an overlap of the values of the first one of the plurality of table columns and the values of the second one of the plurality of table columns is greater than a threshold;
   determining, based on stored metadata, a first data dictionary associated with the first table column and a second data dictionary associated with the second table column;
   merging the first data dictionary and the second data dictionary to generate a merged data dictionary; and modifying the stored metadata to associate the first data dictionary with the merged data dictionary and to associate the second data dictionary with the merged data dictionary.

9. A method according to claim 8, wherein determining the match comprises determining a match between the first table column, the second table column, and a third table column of the plurality of table columns,
wherein merging the first data dictionary and the second data dictionary comprises merging of the first data dictionary, the second data dictionary and the third data dictionary to generate the merged data dictionary, and
wherein modifying the stored metadata comprises modifying the stored metadata to associate the third data dictionary with the merged data dictionary.

10. A method according to claim 9, wherein the first one table column and the second table column belong to a same database table, and wherein the third table column belongs to a different database table.

11. A method according to claim 8, further comprising determining the threshold based on a setting indicating a relative priority between reduced memory consumption and increased performance.

12. A method according to claim 8, wherein the first table column and the second table column belong to a same database table.

13. A method according to claim 8, wherein the first table column and the second table column belong to different database tables.

14. A method according to claim 8, further comprising:
receiving an instruction to commit a first value to the first table column;
determining a first value ID from the merged data dictionary based on the first value;
storing the first value ID in the first table column;
receiving an instruction to commit a second value to the second table column;
determining a second value ID from the merged data dictionary based on the second value; and
storing the second value ID in the second table column.

15. A system according to claim 1, the database management system to:
encode values to be stored in the first one of the plurality of table columns and values to be stored in the second one of the plurality of table columns based on the merged data dictionary.

16. A system according to claim 15, wherein encoding of values to be stored in the first column and values to be stored in the second column comprises:

reception of an instruction to commit a first value to the first one of the plurality of table columns;
determination of a first value ID from the data dictionary based on the first value;
storage of the first value ID in the first one of the plurality of table columns;
reception of an instruction to commit a second value to the second one of the plurality of table columns;
determination of a second value ID from the merged data dictionary based on the second value; and
storage of the second value ID in the second one of the plurality of table columns.

17. A non-transitory computer-readable medium storing processor-executable process steps, the process steps executable by a processor to:
determine a match between a first table column of a plurality of table columns of database tables and a second table column of the plurality of table columns, wherein determination of the match comprises determination that an overlap of values of the first one of the plurality of table columns and values of the second one of the plurality of table columns is greater than a threshold;
determine, based on stored metadata, a first data dictionary associated with the first table column and a second data dictionary associated with the second table column;
merge the first data dictionary and the second data dictionary to generate a merged data dictionary; and
modify the stored metadata to associate the first data dictionary with the merged data dictionary and to associate the second data dictionary with the merged data dictionary.

18. A non-transitory computer-readable medium according to claim 17, wherein determination of the match comprises determination of a match between the first table column, the second table column, and a third table column of the plurality of table columns,
wherein merging of the first data dictionary and the second data dictionary comprises merging of the first data dictionary, the second data dictionary and the third data dictionary to generate the merged data dictionary, and
wherein modification of the stored metadata comprises modification of the stored metadata to associate the third data dictionary with the merged data dictionary.

* * * * *